United States Patent
Wada

(10) Patent No.: US 9,521,327 B2
(45) Date of Patent: Dec. 13, 2016

(54) IMAGE CAPTURING APPARATUS, METHOD FOR CONTROLLING IMAGE CAPTURING APPARATUS, DISPLAY CONTROL APPARATUS, AND METHOD FOR CONTROLLING DISPLAY CONTROL APPARATUS

(71) Applicant: CANON KABUSHIKI KAISHA, Tokyo (JP)

(72) Inventor: Takayuki Wada, Kawasaki-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 14/223,153

(22) Filed: Mar. 24, 2014

(65) Prior Publication Data
US 2014/0294357 A1   Oct. 2, 2014

(30) Foreign Application Priority Data
Apr. 1, 2013   (JP) .................................. 2013-076393

(51) Int. Cl.
H04N 5/775   (2006.01)
H04N 5/232   (2006.01)
H04N 5/77    (2006.01)

(52) U.S. Cl.
CPC .......... H04N 5/23293 (2013.01); H04N 5/775 (2013.01); H04N 5/772 (2013.01)

(58) Field of Classification Search
None
See application file for complete search history.

(56) References Cited

U.S. PATENT DOCUMENTS

| 2005/0083424 A1* | 4/2005 | Tsukagoshi | H04N 5/3728 348/333.01 |
| 2009/0298547 A1* | 12/2009 | Kim | H04W 52/027 455/566 |
| 2012/0069160 A1* | 3/2012 | Ko | H04N 13/0429 348/54 |
| 2013/0113974 A1* | 5/2013 | Cho | H04N 5/57 348/333.01 |
| 2014/0160099 A1* | 6/2014 | Li | G09G 3/36 345/207 |

FOREIGN PATENT DOCUMENTS

JP   2006-171620 A   6/2006

* cited by examiner

*Primary Examiner* — Eileen Adams
(74) *Attorney, Agent, or Firm* — Canon USA, Inc. I.P. Division

(57) ABSTRACT

An image capturing apparatus includes an image capturing unit, a recording control unit configured to perform control to record an image captured by the image capturing unit on a recording medium, a display unit configured to display the image, a detection unit configured to detect information about ambient brightness of the image capturing apparatus, and a control unit configured to perform control to change brightness of the display unit based on a detection result by the detection unit, wherein the control unit performs control so as not to change the brightness of the display unit based on the detection result by the detection unit while the image is recorded on the recording medium.

31 Claims, 3 Drawing Sheets

IMAGE CAPTURING APPARATUS, METHOD FOR CONTROLLING IMAGE CAPTURING APPARATUS, DISPLAY CONTROL APPARATUS, AND METHOD FOR CONTROLLING DISPLAY CONTROL APPARATUS

BACKGROUND OF THE INVENTION

Field of the Invention

The present invention relates to an image capturing apparatus, a method for controlling an image capturing apparatus, a display control apparatus, and a method for controlling a display control apparatus.

Description of the Related Art

Conventionally, digital cameras, mobile phones, and the like having a liquid crystal panel have been known as image capturing apparatuses. Among the image capturing apparatuses, an image capturing apparatus discussed in Japanese Patent Application Laid-Open No. 2006-171620 measures the ambient brightness by use of a luminance sensor or the like provided to a liquid crystal panel and controls the brightness of backlight of the liquid crystal panel based on the measurement result.

However, for example, a method using organic electroluminescence (EL) requires voltage and current differences for each display luminance level and a table indicating voltages and currents for displaying each level. The table is changed in response to an input video signal to change the display luminance. Therefore, there arises a problem that a change in screen luminance is recognized by a user when the table is changed. In other cases in which, for example, the number of levels for liquid crystal backlight control is small, a change in screen luminance may also be recognized by a user when switching the control.

SUMMARY OF THE INVENTION

The present invention is directed to providing an image capturing apparatus, a method of controlling the image capturing apparatus, and a program that prevents a user from recognizing a change in screen luminance under a specific situation.

According to an aspect of the present invention, an image capturing apparatus includes an image capturing unit, a recording control unit configured to perform control to record an image captured by the image capturing unit on a recording medium, a display unit configured to display the image, a detection unit configured to detect information about ambient brightness of the image capturing apparatus, and a control unit configured to perform control to change brightness of the display unit based on a detection result by the detection unit, wherein the control unit performs control so as not to change the brightness of the display unit based on the detection result by the detection unit while the image is recorded on the recording medium.

Further features of the present invention will become apparent from the following description of exemplary embodiments with reference to the attached drawings.

DESCRIPTION OF THE EMBODIMENTS

Figure 1:
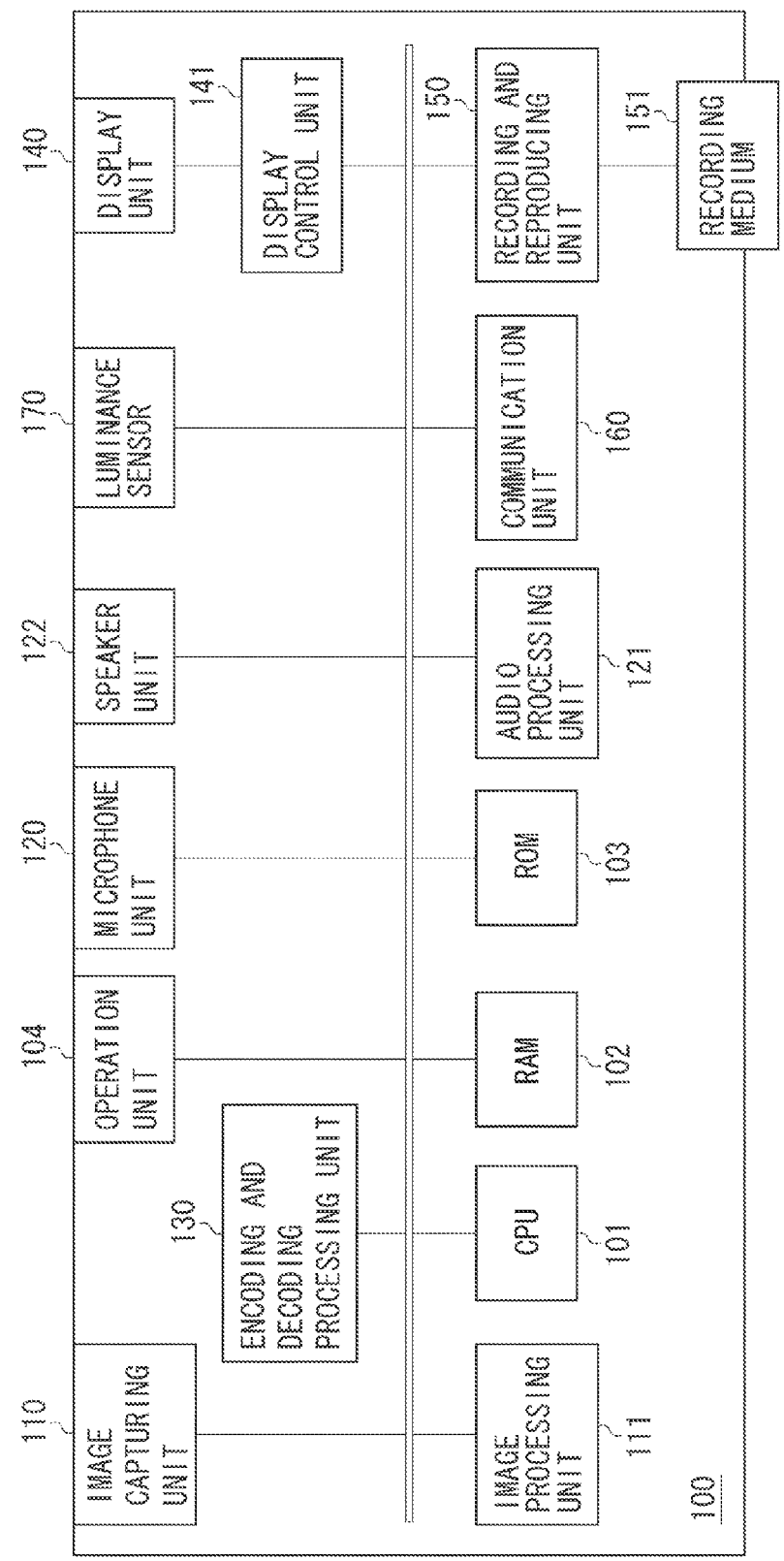
FIG. 1 is a diagram illustrating a configuration of an image capturing apparatus and a display control apparatus according to an exemplary embodiment.

Various exemplary embodiments, features, and aspects of the invention will be described in detail below with reference to the drawings.

The following exemplary embodiment is not intended to limit the scope of the invention set forth in the claims. Further, not every combination of the features described in the exemplary embodiment is always essential to a technical solution provided by the invention.

Each function block described in the present exemplary embodiment does not have to be a separate piece of hardware. Specifically, for example, a single piece of hardware can execute functions of several function blocks. Alternatively, several pieces of hardware can cooperate to execute a function of a single function block or functions of a plurality of function blocks. Alternatively, a function of each function block can be executed through a computer program developed on a memory by a central processing unit (CPU).

The below description for the present exemplary embodiment uses an image capturing apparatus as an example. However, there is no limitation as long as an apparatus includes an image capturing unit, which is capable of recording image data based on a captured image on a recording medium, and includes a display unit configured to display an image based on the captured image. Examples of such an apparatus include a mobile phone, a smartphone, a tablet information terminal, a laptop information terminal, and the like.

The image capturing apparatus according to the present exemplary embodiment includes an image capturing unit 110, an image processing unit 111, a recording unit, a display unit 140, a detection unit, and a control unit. The image capturing unit 110 converts an analog image signal obtained by photoelectrically converting an optical image of an object obtained via a lens into a digital image signal. The image processing unit 111 executes image processing, image compression, and the like on the digital image signal obtained by the image capturing unit 110, transmits the digital image signal for displaying to a memory for displaying, and transmits image data for recording to a memory for recording. The recording unit adds a predetermined header and the like to the image data recorded on the memory for recording and then stores the image data on a recording medium. The display unit 140 displays an image based on the digital image signal recorded on the memory for displaying. The detection unit detects, for example, luminance as information about ambient brightness of the image capturing apparatus and transmits the detected luminance to the control unit configured to control the display unit 140. The control unit controls the brightness of the display unit 140 based on the detection result. The control unit stops controlling the brightness of the display unit 140 based on the detection result while image data based on an image captured by the image capturing unit 110 is recorded on the recording medium. The control unit also stops controlling the brightness of the display unit based on the detection result while image data recorded on the recording medium is reproduced.

Having the foregoing configuration, the image capturing apparatus according to the present exemplary embodiment can prevent a user from recognizing a change in luminance under a specific situation.

The image capturing apparatus according to the present exemplary embodiment will be described as follows.

<Overall Configuration>

The following describes the configuration of an image capturing apparatus 100 according to the present exemplary embodiment with reference to FIG. 1.

As illustrated in FIG. 1, the image capturing apparatus 100 according to the present exemplary embodiment includes a CPU 101, a random access memory (RAM) 102, a read-only memory (ROM) 103, and an operation unit 104. The image capturing apparatus 100 also includes an image capturing unit 110, an image processing unit 111, a microphone unit 120, an audio processing unit 121, and a speaker unit 122. The image capturing apparatus 100 also includes an encoding and decoding processing unit 130, a display unit 140, a display control unit 141, a recording and reproducing unit 150, a recording medium 151, a communication unit 160, and a luminance sensor 170.

In the image capturing apparatus 100 according to the present exemplary embodiment, the CPU 101 uses the RAM 102 as working memory and develops various types of programs recorded on the ROM 103 to the RAM 102 to control each block of the image capturing apparatus 100 according to the programs. The operation unit 104 includes switches and the like for inputting various operations. Examples include a power button, a record button, a zoom adjustment button, an automatic focusing button, a menu display button, a mode changing switch, a determination button, and the like. The operation unit 104 may be any type of operation elements, such as a cursor key, a pointing device, a touch panel, and a dial. The operation unit 104 transmits operation signals to the CPU 101 in response to user operations input via the keys, the buttons, or the touch panel. Each operation member of the operation unit 104 is given a function as appropriate for each scene to act as various types of function buttons in response to user selection operation of various function icons displayed on the display unit. Examples of function buttons include an end button, a return button, an image advancing button, a jump button, a refinement button, an attribute changing button, and the like. For example, if a user presses the menu button, the display unit displays a menu screen via which the user can choose various settings. The user can intuitively choose various settings with the menu screen displayed on the display unit, buttons of four directions (i.e., an up button, a down button, a right button, and a left button) and a set button. The operation unit 104 can be a touch panel that is capable of detecting a touch on the display unit. A touch panel of any type can be used, such as a resistance film type, a capacitance type, a surface acoustic wave touch type, an infrared-ray type, an electromagnetic induction type, an image recognition type, and an optical sensor type.

The image capturing unit 110 controls the amount of light with a diaphragm and converts an optical image of an object captured by a lens into an image signal by use of an image sensor, such as a charge coupled device (CCD) sensor and a complementary metal oxide semiconductor (CMOS) sensor. The image capturing unit 110 converts the obtained analog image signal into a digital image signal and temporarily stores the digital image signal in the RAM 102. The digital image signal stored in the RAM 102 is then transmitted to the image processing unit 111. The image processing unit 111 executes image quality adjustment processing to adjust the white balance, color, brightness, and the like of the digital image signal based on values that are set by the user and/or set values that are automatically determined based on characteristics of the image, and stores the processed digital image signal again in the RAM 102. Then, the digital image signal having undergone the image quality adjustment processing or the unprocessed digital image signal can be transmitted to the display control unit 141, which will be described below, so that the display unit 140 displays it as an image being captured. At the time of reproduction, the image processing unit 111 executes image quality adjustment and the like on image data contained in a still image file or a moving image file read from the recording medium 151 by the recording and reproducing unit 150 and decoded by the encoding and decoding processing unit 130. Then, the digital image signal having undergone the image quality adjustment or the unprocessed digital image signal can be transmitted to the display control unit 141 so that the display unit 140 displays it as an image.

At the time of recording, the encoding and decoding processing unit 130 executes image compression processing on the digital image signal processed by the image processing unit 111 and stored in the RAM 102 to generate compressed moving image data or compressed still image data. Then, the encoding and decoding processing unit 130 temporarily stores the compressed moving image data or the compressed still image data in the RAM 102. At the time of reproduction, the encoding and decoding processing unit 130 decodes the compressed moving image data or the compressed still image data of the image file read from the recording medium 151 to extract the digital image signal, and stores the digital image signal in the RAM 102.

For example, when generating moving image data, each frame of moving image data is intra-frame encoded to generate compressed and encoded moving image data. The compressed and encoded moving image data can also be generated by use of a difference between a plurality of frames of moving image data, motion prediction, and the like. For example, moving image data can be generated using various conventional compression and encoding methods, such as Motion Joint Photographic Experts Group (JPEG), Moving Picture Experts Group (MPEG), MPEG-2, H.264 (MPEG-4-Part 10 Advanced Video Coding (AVC)), H.265/High Efficiency Video Coding (HEVC), etc. In general, frame image data that is intra-frame encoded is called an I picture. Image data that is inter-frame encoded using differences from previous frames is called a P picture. Image data that is inter-frame encoded using differences from previous and following frames is called a B picture. These compression methods are the conventional methods and are irrelevant to features of the present invention, so description thereof is omitted. Further, when generating still image data, a generally used compressing and encoding method is used, such as still image profiles of JPEG, H.265/HEVC, etc. These compression methods are the conventional methods and are irrelevant to features of the present invention, so description thereof is omitted. The still image data may be raw format image data, which is a directly recorded digital image signal obtained by the image capturing unit 110.

The microphone unit 120 includes, for example, an omni-directional microphone built in a housing of the image capturing apparatus 100 and an analog-digital (AD) conversion unit. In the microphone unit 120, the microphone collects ambient sound, and an analog-digital (AD) conversion unit converts the obtained analog audio signal into a digital signal. The digital signal is temporarily stored in the RAM 102. The digital audio signal stored in the RAM 102 is then transmitted to the audio processing unit 121. When recording, the audio processing unit 121 executes processing, such as level adjustment processing and noise reduction processing, on the digital audio signal stored in the RAM 102 and then stores the processed digital audio signal again in the RAM 102. As necessary, the audio processing unit 121 executes processing to compress the audio signal. As for an audio compression method, a generally used audio compression method is used, such as audio code number 3 (AC3) and advanced audio coding (AAC), so description thereof is omitted. Further, when reproducing, the audio processing unit 121 also executes decoding processing, audio level adjustment processing, and other processing on compressed audio data contained in an audio file or a moving image file read from the recording medium 151 by the recording and reproducing unit 150. The audio processing unit 121 also executes processing to sequentially store the processed data in the RAM 102. The speaker unit 122 includes a speaker and a digital-analog (DA) conversion unit. The speaker unit 122 reads the digital audio signal stored in the RAM 102 by the audio processing unit 121, converts the digital audio signal into an analog audio signal, and outputs sound based on the analog audio signal from the speaker.

The luminance sensor 170 detects ambient brightness. The luminance sensor is used to detect ambient brightness in the present exemplary embodiment. However, any sensor capable of detecting information about brightness, such as a luminance sensor and other sensors, can be used.

The display unit 140 is, for example, a liquid crystal display device, an organic EL display device, or the like and is controlled by the display control unit 141 to display an image. The display unit 140 may be any unit, such as a light emitting device (LED) display, capable of providing an image to a user. The display control unit 141 controls the display unit 140 to display an image based on the digital image signal processed by the image processing unit 111 and stored in the RAM 102. The display control unit 141 can execute image signal processing, such as matrix conversion, brightness adjustment, contrast adjustment, gamma adjustment, chroma gain adjustment, and sharpness adjustment, on the video signal based on the digital image signal to be displayed on the display unit 140.

The display control unit 141 controls the display luminance (brightness) of the display unit 140 based on information about the ambient brightness (illuminance) detected by the luminance sensor 170. For example, if the ambient brightness (illuminance) detected by the luminance sensor 170 is higher than a first predetermined threshold value, the display unit 140 displays an image in a first mode of the highest brightness. If the ambient brightness (illuminance) detected by the luminance sensor 170 is lower than the first predetermined threshold value and higher than a second threshold value, the display unit 140 displays an image in a second mode of the second highest brightness. If the ambient brightness (illuminance) detected by the luminance sensor 170 is lower than the second threshold value, the display unit 140 displays an image in a third mode of the third highest brightness.

If the display unit 140 is an organic EL display device, a table indicating pixel values of video signals to currents/voltages for displaying on the organic EL display device is changed according to each mode.

If the display unit 140 is a liquid crystal display device, backlight voltages/currents is changed according to each mode.

There are three display modes in the present exemplary embodiment described below. The number of display modes needs to be at least two, so that there may be more than three display modes.

In the present exemplary embodiment described below, the display control unit 141 changes the display mode based on the information about the ambient brightness (illuminance) detected by the luminance sensor 170. Alternatively, for example, the CPU 101 can change the display mode of the display control unit 141 based on the information about the ambient brightness (illuminance) detected by the luminance sensor 170.

When recording a moving image, the recording and reproducing unit 150 writes the compressed moving image data generated by the encoding and decoding processing unit 130 and the audio data generated by the audio processing unit 121, which are stored in the RAM 102, on the recording medium 151 as a moving image file together with various types of information, such as a shooting date. Further, when recording a still image, the recording and reproducing unit 150 records the still image data stored in the RAM 102 on the recording medium 151 as a still image file together with various types of information, such as a shooting date. When recording a moving image file on the recording medium 151, the recording and reproducing unit 150 generates a data stream containing compressed moving image data and audio data. Then, the recording and reproducing unit 150 sequentially records the data stream on the recording medium 151, and adds a file header or the like to record the moving image file on the recording medium 151 in a format that conforms to a file format, such as a file allocation table (FAT) and an extended file allocation table (exFAT). Further, when reproducing, the recording and reproducing unit 150 reads the moving image file or the still image file recorded on the recording medium 151 according to the file format described above. The CPU 101 analyzes the header of the read moving image file or the read still image file to extract the compressed moving image data or the compressed still image data. The extracted compressed moving image data or the extracted compressed still image data is then stored in the RAM 102 and decoded by the encoding and decoding processing unit 130.

The recording medium 151 may be a recording medium built in the image capturing apparatus or a removable recording medium. Examples include recording medium of any method, such as a hard disk, an optical disk, a magneto-optical disk, a computer disk recordable (CD-R), a digital versatile disk recordable (DVD-R), a magnetic tape, a nonvolatile semiconductor memory, and a flash memory. When a removable recording medium is used, the recording and reproducing unit 150 includes a mechanism for mounting and removing the removable recording medium.

The communication unit 160 receives and transmits control signals, moving image files, still image files, various types of data, and the like from and to an external apparatus other than the image capturing apparatus 100. The communication unit 160 can be connected by wired or wireless connection. As for a communication method, any method can be used.

Each one of the image processing unit 111, the audio processing unit 121, the encoding and decoding processing unit 130, the display control unit 141, and the recording and reproducing unit 150 can be a microphone computer in which a program for executing each function described above is installed. Alternatively, the CPU 101 may load a program that is recorded in the ROM 103 into the RAM 102 and execute it for performing the above-described processing.

While the image capturing apparatus 100 according to the present exemplary embodiment records the moving image files in a "QuickTime (registered trademark) format" as an example, the moving image files can be recorded in any format.

In the present exemplary embodiment, a FAT file system, which is commonly used in a built-in apparatus, is used as a file management system of the recording medium 151. Since a FAT file system is a conventional technique, the FAT file system will be described only in terms of feature operations of the present exemplary embodiment. Other FAT file formats, such as a new technology file system (NTFS) format and an exFAT format, can also be used.

Figure 2:
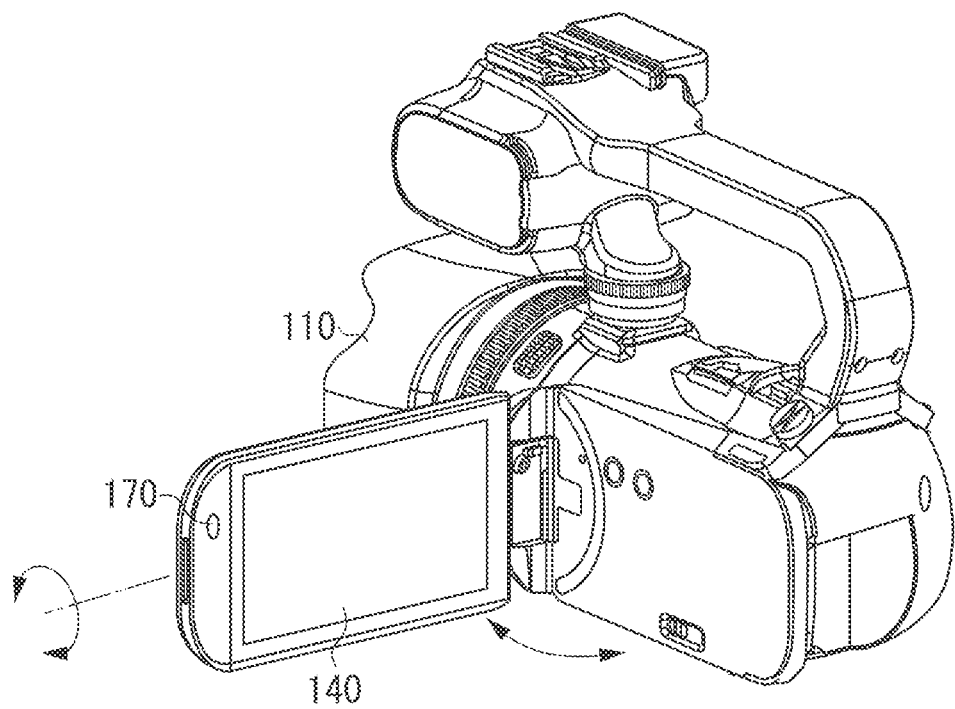
FIG. 2 is an external perspective view of the image capturing apparatus and the display control apparatus according to an exemplary embodiment.

FIG. 2 is an external perspective view of the image capturing apparatus 100 according to the present exemplary embodiment. As illustrated in FIG. 2, the display unit 140 is movably attached to the main body of the image capturing apparatus 100 according to the present exemplary embodiment. Further, the luminance sensor 170 is provided to be capable of measuring at least the brightness of the direction in which the display unit 140 displays an image.

<Basic Operation>

The following describes operations of the image capturing apparatus 100 according to the present exemplary embodiment.

In the image capturing apparatus 100 according to the present exemplary embodiment, the CPU 101 controls a power supply unit (not illustrated) to supply power to each block of the image capturing apparatus 100 in response to a power-on instruction input by a user via the operation unit 104.

Then, the CPU 101 determines whether the mode of the camera that is set by the operation unit 104 is a reproduction mode, a still image recording mode, or a moving image recording mode.

The following describes the moving image recording mode.

If the mode of the camera that is set by the operation unit 104 is the moving image recording mode, the CPU 101 controls each block of the image capturing apparatus 100 to execute the following operation.

First, the image capturing unit 110 transmits an obtained digital image signal to the RAM 102 to temporarily store the digital image signal in the RAM 102. Then, the image processing unit 111 executes the various types of image quality adjustment processing described above on the digital image signal stored in the RAM 102 according to shooting settings and then stores the processed digital image signal again in the RAM 102. The display control unit 141 reads the processed digital image signal or unprocessed digital image signal stored in the RAM 102 to display it on the display unit 140.

Until a user inputs an instruction to start recording of a moving image via the operation unit 104, the display unit 140 displays an image based on an image captured by the image capturing unit 110.

Then, if the user inputs an instruction to start recording of a moving image via the operation unit 104, the image capturing unit 110 transmits the obtained digital image signal to the RAM 102 to temporarily store it in the RAM 102. Then, the image processing unit 111 executes the various types of image quality adjustment processing described above on the digital image signal stored in the RAM 102 according to shooting settings and then stores the processed digital image signal again in the RAM 102. The display control unit 141 reads the processed digital image signal or unprocessed digital image signal stored in the RAM 102 to display it on the display unit 140. The encoding and decoding processing unit 130 executes encoding processing to encode the digital image signal processed by the image processing unit 111 as moving image data. Examples of encoding processing include various types of conventional compressing and encoding processing, such as Motion JPEG, MPEG, H.264 (MPEG-4 Part 10 AVC), and H.265/HEVC.

The audio processing unit 121 applies various types of adjustment processing on the digital audio signal input via the microphone unit and then stores the processed digital audio signal again in the RAM 102. As necessary, the audio processing unit 121 executes encoding processing according to a predetermined audio encoding method and then stores the obtained encoded audio data in the RAM 102. While description of audio data is omitted hereinafter, the audio data is to be processed together with moving image data.

Then, the recording and reproducing unit 150 records the encoded moving image data that is temporarily stored in the RAM 102 as a moving image file that conforms to the file system of the recording medium 151. Further, the recording and reproducing unit 150 includes necessary management information generated by the CPU 101 in the moving image file to record it.

Until the user inputs an instruction to end the recording of the moving image, the CPU 101 controls each block of the image capturing apparatus 100 to execute the foregoing series of processing.

If the user inputs an instruction to end the recording of the moving image via the operation unit 104, the encoding and decoding processing unit 130 operates until it completes encoding of the digital image signal up to the input of the instruction to end the recording, and then the encoding and decoding processing unit 130 ends the operation. Further, the recording and reproducing unit 150 operates until it completes recording of the encoded moving image data that is temporarily stored in the RAM 102 on the recording medium 151, and then the recording and reproducing unit 150 ends the operation. The image capturing unit 110, the image processing unit 111, the display unit 140, and the display control unit 141 continue their operation.

As described above, in the moving image recording mode, the image capturing apparatus 100 according to the present exemplary embodiment records a moving image file on the recording medium 151.

The following describes the reproduction mode.

If the user sets the mode to the reproduction mode via the operation unit 104, the CPU 101 transmits a control signal to each block of the image capturing apparatus 100 to shift to a reproduction state and cause each block to operate as follows.

The recording and reproducing unit 150 reads the moving image file, which is recorded on the recording medium 151, containing the encoded moving image data and the encoded audio data. The CPU 101 buffers the read encoded moving image data and the read encoded audio data in the RAM 102. The CPU 101 controls the encoding and decoding processing unit 130 to decode the encoded moving image data. The CPU 101 also controls the audio processing unit 121 to decode the encoded audio data.

Then, the CPU 101 transmits each frame data of the moving image data decoded by the encoding and decoding processing unit 130 to the display control unit 141 so that the display unit 140 displays an image of each frame. Further, the CPU 101 transmits the audio data decoded by the audio processing unit 121 to the speaker unit 122 so that the speaker unit 122 outputs sound corresponding to the audio data.

As described above, in the reproduction mode, the image capturing apparatus 100 according to the present exemplary embodiment reproduces the moving image file to display an image based on the moving image data of the moving image file on the display unit 140.

<Control for Display Mode>

The following describes a feature operation of the present exemplary embodiment.

Figure 3:
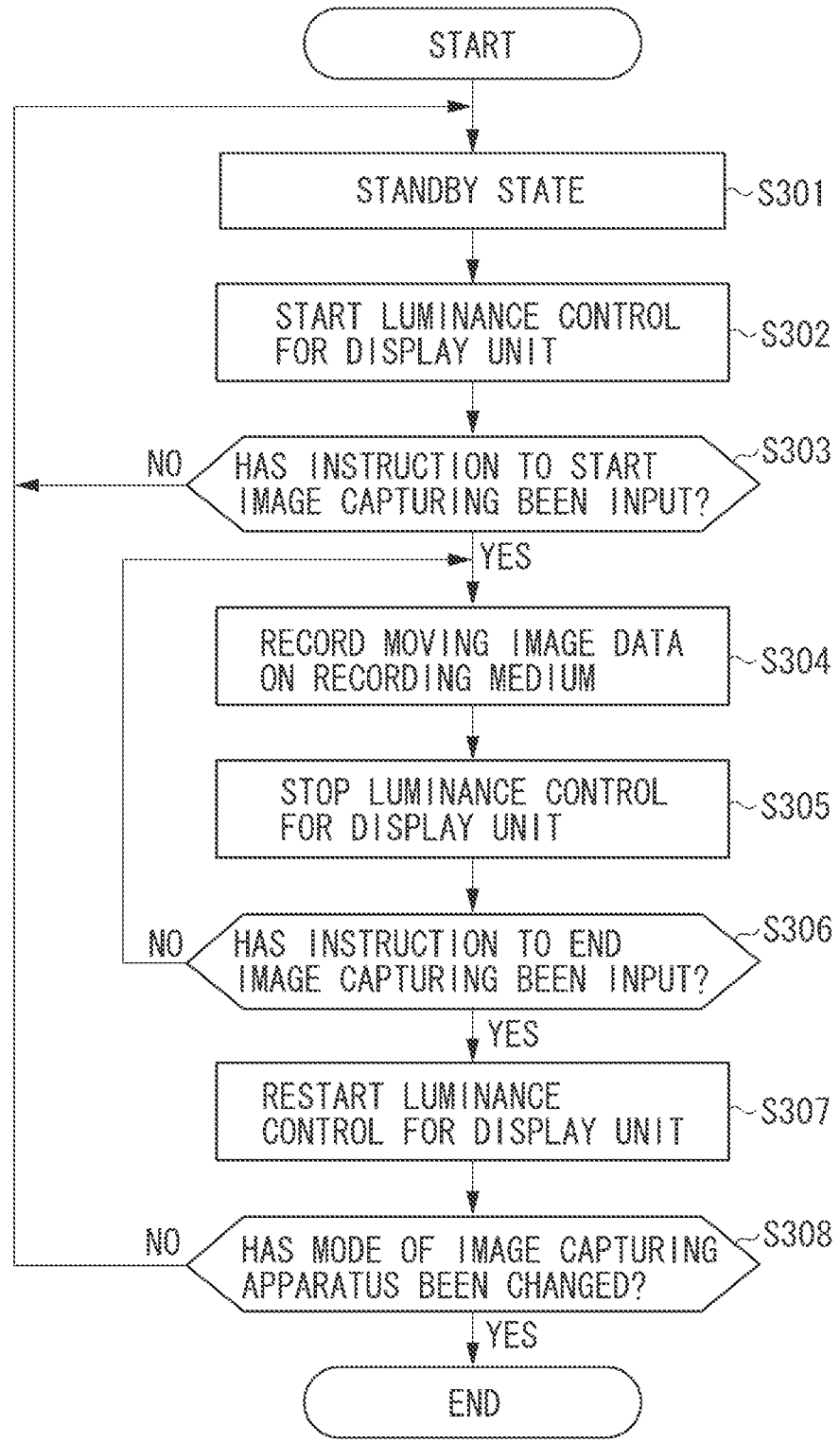
FIG. 3 is a flowchart illustrating operations of the image capturing apparatus and the display control apparatus according to an exemplary embodiment.

FIG. 3 is a flow chart illustrating an operation of the image capturing apparatus 100 according to the present exemplary embodiment in the moving image recording mode. The processing of the flow chart illustrated in FIG. 3 starts when the image capturing apparatus 100 is set to the moving image recording mode. Based on the program developed in the RAM 102, the CPU 101 executes the processing of the flow chart illustrated in FIG. 3 by controlling each block of the image capturing apparatus 100.

In step S301, if the image capturing apparatus 100 is set to the moving image recording mode, the CPU 101 controls each block of the image capturing apparatus 100 to operate in the standby state (i.e., no recording of a moving image data is executed) in which the display unit 140 displays an image based on the image obtained by the image capturing unit 110, as described above.

In step S302, the CPU 101 controls the display control unit 141 to change the luminance of the display unit 140 based on a detection result by the luminance sensor 170. As described above, for example, if the ambient brightness (illuminance) detected by the luminance sensor 170 is higher than the first predetermined threshold value, the display control unit 141 displays the image in the first mode of the highest brightness. If the ambient brightness (illuminance) detected by the luminance sensor 170 is lower than the first predetermined threshold value and higher than the second threshold value, the display control unit 141 displays the image in the second mode of the second highest brightness. If the ambient brightness (illuminance) detected by the luminance sensor 170 is lower than the second threshold value, the display control unit 141 displays the image in the third mode of the third highest brightness. The CPU 101 can change the display mode of the display control unit 141 based on information about the ambient brightness (illuminance) detected by the luminance sensor 170.

In step S303, the CPU 101 determines whether an instruction to start image capturing has been input via the operation unit 104. If the CPU 101 determines that no instruction to start image capturing has been input (No in step S303), the processing proceeds to step S301, and the CPU 101 repeats the processing up to step S303. On the other hand, if an instruction to start image capturing has been input (Yes in step S303), then in step S304, the CPU 101 controls the recording and reproducing unit 150 to record the moving image data based on the image obtained by the image capturing unit 110 on the recording medium, as described above.

In step S305, the CPU 101 controls the display control unit 141 to stop the operation to change the luminance of the display unit 140 based on the detection result by the luminance sensor 170.

In step S306, the CPU 101 determines whether an instruction to end the image capturing has been input via the operation unit 104. If the CPU 101 determines that no instruction to end the image capturing has been input (No in step S306), then the processing returns to step S304, and the CPU 101 repeats the processing up to step S303. On the other hand, if an instruction to end the image capturing has been input (Yes in step S306), then in step S307, the CPU 101 restarts the operation to change the luminance of the display unit 140 based on the detection result by the luminance sensor 170.

In step S308, the CPU 101 determines whether the mode of the image capturing apparatus 100 is changed from the moving image recording mode to a different mode. If the moving image recording mode is ended (Yes in step S308), then the CPU 101 ends the processing. On the other hand, if the moving image recording mode is not ended (No in step S308), then the processing returns to step S301, and the CPU 101 continues the processing.

As described above, the image capturing apparatus 100 according to the present exemplary embodiment executes the luminance control for the display unit 140 based on the detection result by the luminance sensor 170 from the starting of the moving image recording mode until the starting of recording of moving image data. In response to the start of the recording of moving image data, the image capturing apparatus 100 stops the luminance control for the display unit based on the detection result by the luminance sensor 170.

With the foregoing operation, the image capturing apparatus 100 according to the present exemplary embodiment can perform control so as not to occur a sudden change of screen luminance, which is associated with a change in ambient brightness, while moving image data is recorded. Thus, the users are prevented from recognizing a change in screen luminance during recording of moving image data. Furthermore, the image capturing apparatus 100 does not execute the luminance control based on the ambient brightness during recording of moving image data. This can reduce the possibility that the user misunderstands that the image capturing apparatus 100 is performing unintended moving image capturing by the changes of the luminance of the display unit 140 during recording of moving image data in the image capturing apparatus 100.

While the present exemplary embodiment is described above with the case in which the luminance control for the display unit 140 is started or stopped based on the result of detection by the luminance sensor 170, the operation of the luminance sensor 170 can also be started or stopped in an interlocked manner.

While, in the present exemplary embodiment, the operation of the luminance sensor is restarted in response to an instruction to end the recording of moving images, the possibility that continuous image capturing may be executed after a while may be taken into consideration. Specifically, the operation of the luminance sensor 170 can be kept stopped for a predetermined period of time from the time when the instruction to end the recording of moving images was input. During the period, if the user operates the operation unit 104, the operation of the luminance sensor 170 can be started. Even if no user operation is performed via the operation unit 104, the operation of the luminance sensor 170 can be started after elapse of a predetermined period of time.

The present exemplary embodiment corresponds to the case in which the display unit 140 is an organic EL display device and also to the case in which the display unit 140 is a liquid crystal display device when the display control unit 141 changes the display mode according to ambient brightness. In the case in which the display unit 140 is an organic EL display device, the table indicating pixel values of video signals to currents/voltages for displaying on the organic EL display device is changed to change the display luminance property. In the case in which the display unit 140 is a liquid crystal display device, a backlight voltage/current is changed to change the display luminance property. However, if the display unit 140 includes a gamma adjustment unit configured to adjust the luminance, the display control unit 141 can control a gamma table (display luminance property) of the display unit 140 according to the ambient brightness in response to an instruction from the CPU 101.

While, in the present exemplary embodiment, the luminance control for the display unit is performed interlocked with the start or end of the recording of a moving image in the moving image recording mode, the same operation can be executed at the time of reproduction. Specifically, in the reproduction mode, the luminance control for the display unit is stopped during reproduction of image data recorded on the recording medium and is started after the reproduction is ended. Further, while a list screen showing image data recorded on the recording medium is displayed, the luminance control for the display unit is executed. While selected image data is reproduced, the luminance control for the display unit is stopped. After the reproduction is ended, the luminance control for the display unit is started. Further, the luminance control for the display unit can be stopped only while moving image data is reproduced, and the luminance control can be started after the reproduction is ended.

The foregoing exemplary embodiment can also be realized by a computer (or central processing unit (CPU), micro processing unit (MPU), etc.) of a system or apparatus by means of software. Accordingly, a computer program supplied to a computer to realize the exemplary embodiment on the computer also realizes the present invention. In other words, a computer program configured to realize the functions of the exemplary embodiment is also included in the present invention.

The computer programs configured to realize the exemplary embodiment described above may be in any computer-readable form. Non-limiting examples include an object code, a program to be executed by an interpreter, script data to be supplied to an operating system (OS), and the like. The computer programs configured to realize the exemplary embodiment described above is supplied to a computer from a storage medium or via wired/wireless communication. Examples of a storage medium for use to supply a program include a flexible disk, a hard disk, a magnetic storage medium such as a magnetic tape, an optical/magneto-optical storage medium such as a magneto-optical (MO) disk, a compact disk (CD), and a DVD, a nonvolatile semiconductor memory, etc.

Methods for supplying a computer program using wired/wireless communication include a method using a server on a computer network. In this case, a data file (program file) that may serve as a computer program forming the present invention is stored on a server. The program file may be of an execution type or source code. Then, the data file is supplied by allowing the program file to be downloaded to a client computer that has accessed the server. In this case, the program file can be divided into a plurality of segment files, and the segment files can be distributed and arranged to different servers. In other words, a server apparatus configured to supply a program file configured to realize the exemplary embodiment described above to a client computer is also included in the present invention.

Further, a storage medium storing an encrypted computer program configured to realize the exemplary embodiment described above can be distributed, and key information for decrypting the encrypted computer program can be supplied to a user satisfying predetermined conditions to allow the user to install the computer program into a computer owned by the user. The key information can be supplied by, for example, allowing the user to download the key information from the homepage via the Internet. The computer program configured to realize the exemplary embodiment described above can use functions of an OS that is already running on a computer. Furthermore, part of a computer program for realizing the exemplary embodiment described above can be configured as firmware, such as an expansion board attached to a computer, or can be executed by a CPU included in an expansion board or the like.

The present invention can prevent a user from recognizing a change in screen luminance under a specific situation.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-076393 filed Apr. 1, 2013, which is hereby incorporated by reference herein in its entirety.

What is claimed is:

1. An image capturing apparatus comprising:
an image capturing unit;
a recording control unit configured to perform control to record an image captured by the image capturing unit on a recording medium;
a display unit configured to display the image;
a detection unit configured to detect information about ambient brightness of the image capturing apparatus; and
a control unit configured to: (1) perform control to change brightness of the display unit based on a detection result by the detection unit when the image capturing apparatus is in a predetermined state among states in which the recording control unit does not perform control to record the image captured by the image capturing unit; and (2) perform control to prevent the change of the brightness of the display unit based on a detection result by the detection unit from brightness having been changed based on the information about ambient brightness detected before starting of image recording when the recording control unit performs control to record the image captured by the image capturing unit.

2. The image capturing apparatus according to claim 1, wherein the display unit is an organic electroluminescence display device.

3. The image capturing apparatus according to claim 1, wherein the display unit is a liquid crystal display device, and the control unit performs control to change brightness of backlight of the liquid crystal display device based on the detection result by the detection unit.

4. The image capturing apparatus according to claim 1, wherein the control unit performs control to increase the brightness of the display unit as the ambient brightness is higher, based on the detection result by the detection unit.

5. The image capturing apparatus according to claim 1, wherein the control unit changes a display luminance property of the display unit with respect to a video signal based on the detection result by the detection unit.

6. The image capturing apparatus according to claim 1, wherein the control unit starts controlling the brightness of the display unit based on the detection result by the detection unit in response to an end of a recording of the image captured by the image capturing unit.

7. The image capturing apparatus according to claim 1, wherein the control unit starts controlling the brightness of the display unit based on the detection result by the detection unit in response to an elapse of a predetermined period of time from an end of the recording of the image captured by the image capturing unit.

8. The image capturing apparatus according to claim 1, wherein the control unit starts controlling the brightness of the display unit based on the detection result by the detection unit in response to an operation of the image capturing apparatus after an end of the recording of the image captured by the image capturing unit.

9. The image capturing apparatus according to claim 1, wherein the control unit starts controlling the brightness of the display unit based on the detection result by the detection unit in response to an elapse of a predetermined period of time from an end of the recording of the image captured by the image capturing unit, or in response to an operation of the image capturing apparatus before the elapse of the predetermined period of time.

10. The image capturing apparatus according to claim 1, wherein the image is a moving image.

11. The image capturing apparatus according to claim 1, wherein the detection unit is a luminance sensor.

12. The image capturing apparatus according to claim 1, wherein the detection unit is placed at a position in the image capturing apparatus at which the detection unit can detect the brightness of a display screen side of the display unit.

13. A method of controlling an image capturing apparatus including an image capturing unit, a display unit configured to display an image, and a detection unit configured to detect information about ambient brightness of the image capturing apparatus, the method comprising;
performing recording control to record the image captured by the image capturing unit on a recording medium;
(1) performing control to change brightness of the display unit based on a detection result by the detection unit when the image capturing apparatus is in a predetermined state among states in which the recording control unit does not perform control to record the image captured by the image capturing unit; and
(2) performing control to prevent the change of the brightness of the display unit based on a detection result by the detection unit from brightness having been changed based on the information about ambient brightness detected before starting of image recording when the recording control unit performs control to record the image captured by the image capturing unit.

14. A computer-readable non-transitory storage medium storing a program that causes a computer to execute the method for controlling according to claim 13.

15. An image capturing apparatus comprising:
an image capturing unit;
a recording control unit configured to perform control to record a moving image captured by the image capturing unit on a recording medium;
a display unit configured to display the moving image;
a detection unit configured to detect information about ambient brightness of the image capturing apparatus; and
a control unit configured to: (1) perform control to execute an information detection about ambient brightness of the image capturing apparatus by the detection unit to change brightness of the display unit based on a detection result by the detection unit when the image capturing apparatus is in a predetermined state among states in which the recording unit does not perform control to record the moving image captured by the image capturing unit; and (2) perform control to prevent executing the information detection having been performed before starting of image recording when the recording control unit performs control to record the moving image captured by the image capturing unit on the recording medium.

16. A method of controlling an image capturing apparatus including an image capturing unit, a display unit configured to display an image, and a detection unit configured to detect information about ambient brightness of the image capturing apparatus, the method comprising;
performing recording control to record the moving image captured by the image capturing unit on a recording medium;
(1) performing control to execute an information detection about ambient brightness of the image capturing apparatus by the detection unit to change brightness for displaying based on a detection result by the detection unit when the image capturing apparatus is in a predetermined state among states in which control to record the moving image captured by the image capturing unit is not performed; and
(2) performing control to prevent executing the information detection having been performed before starting of image recording when performing control to record the moving image captured by the image capturing unit on the recording medium.

17. A computer-readable non-transitory storage medium storing a program that causes a computer to execute the method for controlling according to claim 16.

18. A display control apparatus comprising:
a reading unit configured to read an image from a recording medium;
a display unit configured to display the image read by the reading unit;
a detection unit configured to detect information about ambient brightness of the display control apparatus; and
a control unit configured to: (1) perform control to change brightness of the display unit based on a detection result by the detection unit when the display control apparatus is in a predetermined state among states in which the image read by the reading unit is not being reproduced and displayed; and (2) perform control to prevent the change of the brightness of the display unit based on a detection result by the detection unit from brightness having been changed based on the information about ambient brightness detected before starting of image recording when the image read by the reading unit is being reproduced and displayed.

19. The display control apparatus according to claim 18, wherein the display unit is an organic electroluminescence display device.

20. The display control apparatus according to claim 18, wherein the display unit is a liquid crystal display device, and the control unit performs control to change brightness of backlight of the liquid crystal display device based on the detection result by the detection unit.

21. The display control apparatus according to claim 18, wherein the control unit performs control to increase the brightness of the display unit as ambient brightness is higher, based on a result of detection by the detection unit.

22. The display control apparatus according to claim 18, wherein the control unit changes a display luminance property of the display unit with respect to a video signal based on the detection result by the detection unit.

23. The display control apparatus according to claim 18, wherein the image is a moving image.

24. The display control apparatus according to claim 18, wherein the detection unit is a luminance sensor.

25. The display control apparatus according to claim 18, wherein the detection unit is placed at a position in the display control apparatus at which the detection unit can detect the brightness of a display screen side of the display unit.

26. The display control apparatus according to claim 18, wherein the control unit controls the brightness of the display unit based on the detection result by the detection unit while the display unit displays a list of a plurality of images recorded on the recording medium.

27. A method of controlling a display control apparatus including a display unit configured to display an image and a detection unit configured to detect information about ambient brightness of the display control apparatus, the method comprising:
reading an image from a recording medium;
performing display control to display the image read in the reading step;
(1) performing control to change brightness for displaying based on a detection result by the detection unit when the display control apparatus is in a predetermined state among states in which the image read by the reading unit is not being reproduced and displayed; and
(2) performing control to prevent the change of the brightness of the display unit based on a detection result by the detection unit from brightness having been changed based on the information about ambient brightness detected before starting of image recording when the image read by the reading unit is being reproduced and displayed.

28. A non-transitory computer-readable storage medium storing a program that causes a computer to execute the method for controlling according to claim 27.

29. A display control apparatus comprising:
a reading unit configured to read an image from a recording medium;
a display unit configured to display the image read by the reading unit;
a detection unit configured to detect information about ambient brightness of the display control apparatus; and
a control unit configured to: (1) perform control to change brightness of the display unit based on a detection result by the detection unit; and (2) perform control to prevent executing the detection, which is brightness detection having been performed by the detection unit before starting of the image reproduction, while the image read by the reading unit is reproduced and displayed.

30. A method of controlling a display control apparatus including a display unit configured to display an image and a detection unit configured to detect information about ambient brightness of the display control apparatus, the method comprising:
reading an image from a recording medium;
performing display control to display the image read in the reading step;
(1) performing control to execute an information detection about ambient brightness of the image capturing apparatus by the detection unit and to change brightness for the displaying unit based on a detection result by the detection unit when the display control apparatus is in a predetermined state among states in which the image read from the recording medium is not reproduced and displayed; and
(2) performing control to prevent executing the information detection having been performed before starting of the image reproduction when the image read in the reading step is reproduced and displayed.

31. A non-transitory computer-readable storage medium storing a program that causes a computer to execute the method for controlling according to claim 30.

* * * * *